June 19, 1956 R. L. ERWIN 2,750,861
MOUNTING FOR DISC TYPE SOIL WORKING TOOLS
Filed July 21, 1952
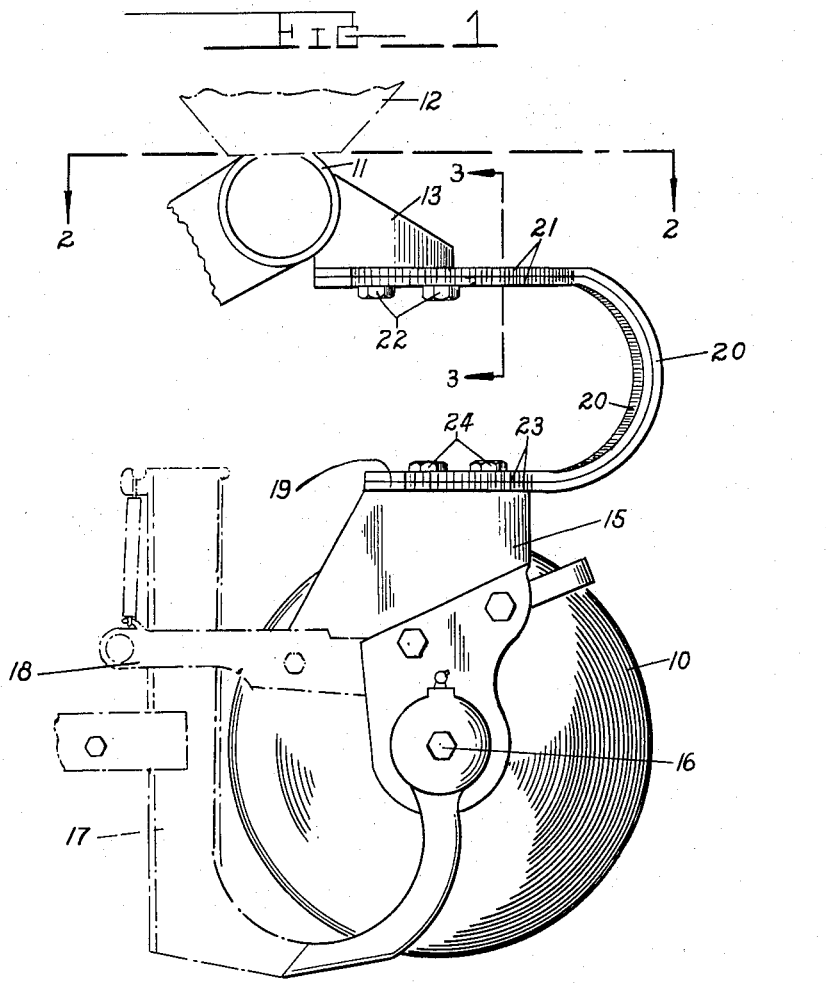
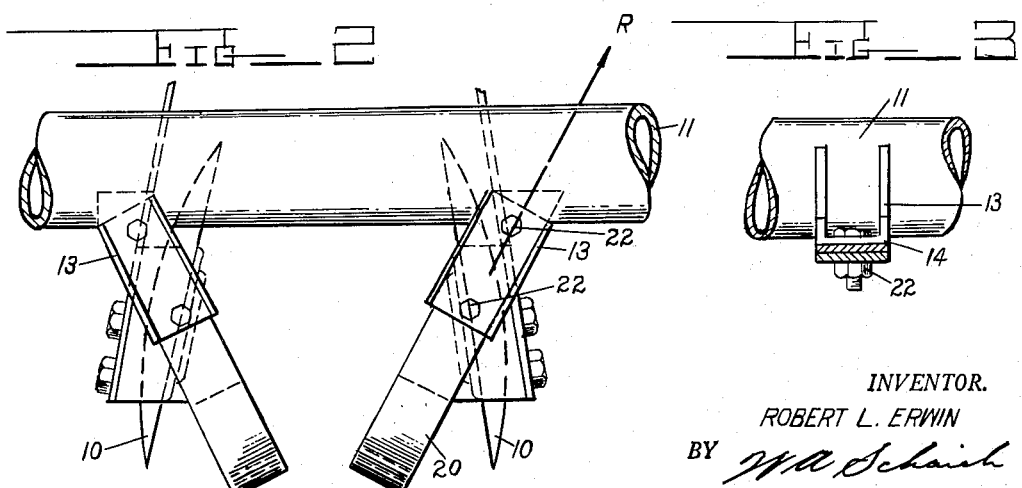
INVENTOR.
ROBERT L. ERWIN
BY *W. R. Schaich*
AND *H. P. Settle, Jr.*
ATTORNEYS 2,750,861
Patented June 19, 1956

2,750,861
MOUNTING FOR DISC TYPE SOIL WORKING TOOLS

Robert L. Erwin, Royal Oak, Mich., assignor, by mesne assignments, to Ford Motor Company, Dearborn, Mich., a corporation of Delaware Application July 21, 1952, Serial No. 300,069

1 Claim. (Cl. 97—54)

This invention relates to an improved mounting for disc-type soil working tools for farm implements.

Many types of farm implements employ discs for various soil working purposes such as opening a furrow to receive seed from a planter and also for hilling soil around the base of growing plants. Where the soil has many obstructions, such as rocks or roots, the abnormal stresses and shock forces imparted to the mounting of the disc when the disc strikes such obstructions are most injurious and it has been common to provide resilient mountings for such discs.

In order for any soil working disc to function properly, it must be disposed at an angle to the line of draft of the implement. When the disc is so disposed, the action of the soil on the disc as it passes through the soil exerts a relatively large side draft force on the disc, which has to be resisted by the disc mounting. Therefore, the resultant reaction force on the disc is not in a plane parallel to the direction of travel. In conventional resilient mountings this force tends to set up lateral vibration of the disc during normal travel through the soil and thus detrimentally affects the soil working action of the disc. Furthermore, the application of lateral stresses to conventional resilient disc mountings results in rapid failure of such mountings due to fatigue effects.

Accordingly, it is an object of this invention to provide an improved mounting for disc-type soil working implements for resiliently supporting such implements on an implement frame.

Another object of this invention is to provide a resilient mounting for disc-type soil working tools which substantially reduces the harmful effect of shock loads on the mounting, but it is not subject to vibration during normal travel through the soil.

A further object of this invention is to provide an improved resilient mounting for disc-type soil openers which permits the opener to pass over obstructions without injury and also readily absorb the vibration producing side draft forces on the disc.

The specific nature of this invention, as well as other objects and advantages thereof will become apparent to those skilled in the art from the following detailed description, taken in conjunction with the attached sheet of drawings on which, by way of preferred example only, is illustrated one embodiment of this invention.

On the drawings:

Figure 1 is an enlarged scale side elevational view showing the improved disc mounting constructed in accordance with this invention illustrating the manner of mounting a disc opener on a grain drill;

Figure 2 is a reduced scale sectional view taken along the plane 2—2 of Figure 1; and Figure 3 is a cross sectional view taken on line 3—3 of Figure 1.

As shown on the drawings:

While the mounting of this invention is applicable to any type of soil working disc, as a particular example Figure 1 shows a disc opener 10 mounted in depending relationship to the transverse tubular frame 11 of a grain drill. The usual seed hopper, indicated schematically in Figure 1 and represented by the numeral 12, is mounted on top of the transverse tubular frame member 11.

On the forward edge of the transverse tubular frame member 11 a plurality of U-shaped brackets 13 are angularly secured thereto, as by welding. The brackets 13 have their bight portions 14 projecting somewhat below the bottom of the transverse tubular member 11 and such bight portions are horizontally disposed. The disc 10 is rotatably journaled on an upstanding disc support member 15 which is of the conventional construction commonly employed on a well-known make of grain drill. A bolt or axle 16 rotatably secures the disc 10 to the support 15. A seed boot 17, shown in dotted outline in Figure 1, is usually associated with the disc support 15 and an arm 18 secures such seed boot to the support 15. The support 15 has a horizontal top portion 19 for a purpose to be presently described.

The improved mounting of this invention includes a hanger 20 which comprises a pair of U-shaped spring members nested together to form, in effect, a unitary member. The arms of the U-shaped hanger 20 are horizontally disposed in parallel relationship and the upper arm 21 of the U-shaped hanger 20 is secured by a pair of bolts 22 to the underside of the horizontal bight portion 14 of the U-shaped bracket 13 and in alignment therewith but with the bight portion of hanger 20 disposed forwardly. The lower arm 23 of the hanger is secured by a pair of bolts 24 to the horizontal top portion 19 of the disc support 15.

Referring particularly to Figure 2, it will be noted that the brackets 13 are angularly disposed in a horizontal plane relative to the axis of the tubular frame member 11. It will be further noted that the discs 10 are also angularly disposed relative to the axis of the frame member 11 and hence with respect to the direction of travel of the implement. The angular position of the disc 10 relative to the frame member 11 enables such discs to open a furrow in the soil as the implement traverses the ground. A side draft force of substantial magnitude is thus imparted to the disc 10 in addition to the usual longitudinal draft reaction force resulting from pulling the disc through the soil. Hence a resultant force R acts on the disc 10 and such force acts in a different direction from either of the two primary draft forces. In accordance with this invention, the angular disposition of the bracket 13 and hanger 20 relative to frame member 11 is selected to be substantially aligned or parallel to the normal direction of the resultant force R, as best shown in Figure 2.

While only the mounting for one of the discs 10 has been here described, it will be appreciated that the other discs mounted in depending relationship to the tubular frame member 11 are of similar construction and hence need not be further described. It will be noted, however, that in a grain drill type of implement where a large number of disc openers are used, the side draft forces of the disc 10 acting on the implement are largely neutralized by angling the right-hand half of the discs in one direction and the left-hand half in the opposite direction, as indicated in Figure 2.

The resiliency of the hanger 20 reduces to a very large extent any harmful effect of shock forces in the mounting. Thus, when the disc 10 strikes an obstruction in the ground, the hanger 20 will flex sufficiently to substantially reduce the possibility of damage.

At the same time the angular disposition of the spring hanger 23 eliminates production of lateral twisting and deflecting forces in such spring member and substantially increases the useful life of the hanger.

It will, of course, be understood that various details of construction may be varied through a wide range without departing from the principles of this invention and it is, therefore, not the purpose to limit the patent granted hereon otherwise than necessitated by the scope of the appended claim.

I claim:

In an agricultural implement having a disc type soil working tool mounted in depending relation thereto; the combination of a transverse tool supporting member, at least one bifurcated upper support member fixedly secured to the forward side of said tool supporting member and having its bight section projecting below the tool supporting member, a substantially U-shaped leaf spring hanger comprised of an inner and outer leaf spring, means for fixedly securing the upper portion of said leaf spring hanger to the underside of the bight portion of the upper support member, a lower disc bracket, means for fixedly securing the lower portion of said leaf spring hanger to the upper portion of the lower disc bracket, means for rotatably mounting the disc on one arm of said lower disc bracket and maintaining said disc in a fixed relationship to said bracket, said upper support member, leaf spring hanger, and lower disc bracket being aligned in the same vertical plane and angularly disposed in substantial alignment or parallelism with the resultant of draft reacting forces acting on said disc.

References Cited in the file of this patent

UNITED STATES PATENTS

| 1,058,140 | Beene | Apr. 8, 1913 |
| 1,709,536 | Morris | Apr. 16, 1929 |
| 2,068,303 | Priefert | Jan. 19, 1937 |
| 2,211,675 | Rushbrook | Aug. 13, 1940 |

FOREIGN PATENTS

| 306,204 | Great Britain | Feb. 21, 1929 |